Sept. 5, 1933.  S. DREW  1,925,919
METHOD OF AND APPARATUS FOR PRODUCING SOUND RECORDS
Filed July 15, 1932
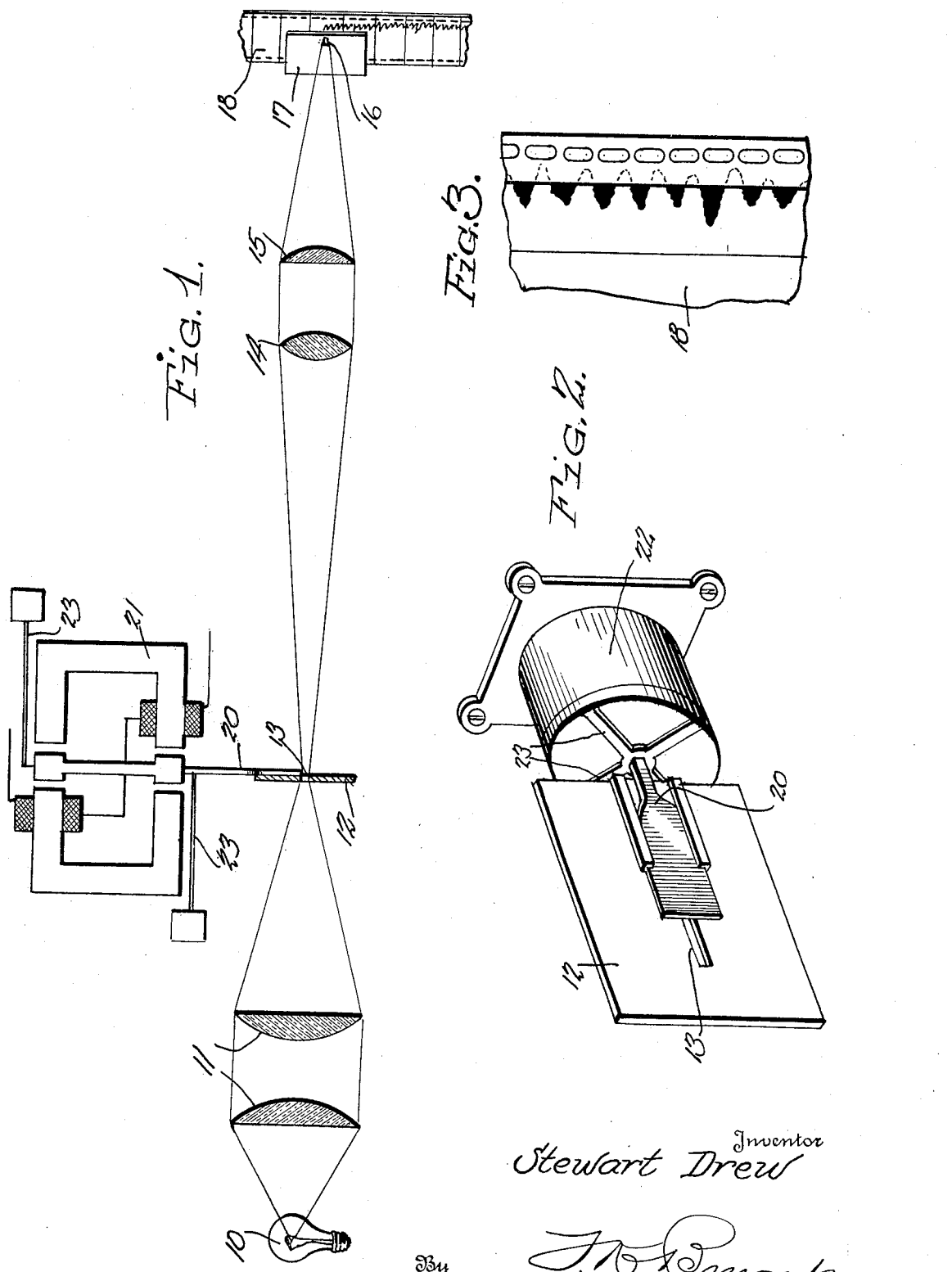

Patented Sept. 5, 1933

1,925,919

UNITED STATES PATENT OFFICE 1,925,919

METHOD OF AND APPARATUS FOR PRODUCING SOUND RECORDS

Stewart Drew, Etna, N. Y.

Application July 15, 1932. Serial No. 622,733

6 Claims. (Cl. 179—100.3)

This invention relates to a method of and apparatus for producing sound records and has special reference to the production of a photographic sound record adapted to be used in connection with photo-electric reproduction.

It is a well known fact that sound, as it is generally heard, is produced by atmospheric waves or pulsations and that, for many sounds the forms of these waves vary as the source from which they emanate varies. In other words, the waves from a given source have an individual form dependent on the overtones accompanying the fundamental tone. Thus, the sound wave produced by bowing a violin string has an entirely different form from that produced by striking a piano string with its hammer and that again is different from the form produced by an organ note. The shapes of such waves may be plotted by moving a lamp-blacked plate transversely of the vibrations of a sound producing element and in contact with the end of a bristle fixed to the vibrating body and, if this be done, there will be traced in the lamp-black a series of waves each roughly approaching a sine wave in form but usually irregular in outline. With such a record each ascending side of the curve represents a compression effected in the air or other sound transmitting medium while each descending side represents a rarefaction or decompression of the medium, the irregularities representing irregularities in the compression and decompression dependent, as before stated, on the overtones which thus modify the fundamental curve.

In the photographic recording of sound two general methods have hitherto been used. In each of these light from a suitable source is projected through a slot onto a photographically sensitized film or portion of a film, such as the portion of a motion picture film known as the sound track. In one of these forms the light, which is in the form of a flat ribbon in both cases, has its intensity varied by means of a suitable shutter arrangement so that, when developed, the film presents a band of uniform width consisting of alternate more and less transparent portions. In the other form the ribbon of light is allowed to fall on the film and, by means of a suitable shutter carried by a suitable electro-magnetic sound reproducer unit, the width of this light ribbon is varied. When such a film is developed and printed from there will be produced an opaque band having the characteristic wave outline along side of which is a complementary transparent band. It is to be carefully noted that it is the opaque band which is that actually recording the sound waves. If, now, a positive of such a film be interposed between a light source and a photoelectric cell and moved longitudinally, light alternately brighter and dimmer will strike the cell thus affecting the current passing therethrough and such variable current may, by suitable means, be caused to control the action of an electro-magnetic or dynamic loud speaker. Objections exist to both of these methods of recording and the first form is less sensitive than the second which is preferable on many accounts. However, the second form presents the grave objection that the operation of the photo-electric cell in reproduction is controlled by what may be termed the residual light of the flat beam or ribbon since the shutter cuts off light during the compression of the sound transmitting mediums and admits more light during the decompression. The wave form of the transparent portion of the film being complementary to the true wave form, the loud speaker action is also necessarily complementary to its usual action. That is, increase of the light action on the cell produces an action of the loud speaker resulting in a rarefaction impulse on the air instead of a compression impulse. It has been found that perception of sound depends far more on the peak portion of the waves than on the basal portions thereof. That is to say, the basal portions of the waves may be considerably eliminated without any change in the volume, pitch or timbre of the sound being perceptible while the least elimination of any part of the peak of the wave changes the entire character of the sound as heard by the ear. Where the sound method above mentioned is used any slight lateral irregularity in the movement of the film, which often happens, results in the peak portions of some of the waves being cut off thus changing the character of the sound.

The principal objects of the present invention are to produce an improved method of and apparatus for recording sound waves photographically in such manner that when, positive photograph of such wave will show the wave itself as a transparent band.

This method will produce an accurate photographic record of the original sound waves as produced when properly developed and printed by the usual photographic method, as the devices used and described respond to frequencies of all audible sound waves and therefore a true record of sound will result.

With the above and other objects in view, as will be hereinafter apparent, the invention consists in general of a novel method of recording sound waves photographically and of certain novel combinations of elements and arrangements of parts in an apparatus for carrying such method into effective execution, the method and apparatus being hereinafter fully described and specifically claimed and a typical apparatus being shown in the accompanying drawing.

In the accompanying drawing like characters of reference indicate like parts in the several views, and Figure 1 is a diagrammatic view of one form of apparatus for carrying this invention into effective operation;

Figure 2 is a detail perspective showing a slight modification of such an apparatus;

Figure 3 is a view showing a portion of developed negative photograph of sound waves recorded in accordance with this invention.

In the apparatus here shown there is provided an electric lamp 10 of the type having a rectilinear incandescent filament so that light emanating therefrom in a direction radial to the filament will be of ribbon form as it leaves the filament to radiate in the usual manner. Light from the filament strikes a lens system consisting of a pair of plano-convex lenses 11 arranged with their convex faces confronting each other. These lenses form a condenser system which condenses the light onto a fixed screen 12 having a small horizontal slot 13 therein. These parts are so positioned that the condensed light falls on the slot. When this slot is open the light passes therethrough in the form of a ribbon and falls on a double convex lens 14 through which it passes to a plano-cylindrical lens 15 and from there to the horizontal slot 16 of a screen 17 located directly in front of a film 18. The lens 14 corrects any dispersion of the ribbon and the lens 15 is so proportioned as to ensure the ribbon of light being of desired width upon striking the film, the slotted screen 17 being used to prevent halation.

The film 18 is drawn past the slot 16 by the usual means and, as this means is old and well known and forms no specific part of the present invention it is not deemed necessary here to show the same.

Mounted against the screen 12 is a shutter 19 and it is essential to note that the normal or inactive position of this shutter is such that the slot 13 is just entirely closed so that no light can pass to the film 18. The forward edge of this shutter is exactly alined with the end of the slot so that the least movement of the shutter uncovers a portion of the slot.

This shutter 19 is fixed on the stem 20 of a reproducer or speaker unit either of the magnetic type as at 21 in Figure 1 or of the dynamic type as at 22 in Figure 2. The shutter is held normally closed by the springs 23 and the speaker unit is so arranged that its action is to open the shutter upon energization and to allow the shutter to be closed by the springs upon de-energization. These speaker units may be of any of the well known commercial types and it is not thought necessary here to enter into an explanation of their specific constructions as the same are old and well known and such specific constructions form no part of the present invention. It is to be noted, however, that such units, if properly proportioned, effectually operate in connection with a microphone or other receiver to transform sound waves into corresponding electro-magnetic waves which are in turn transformed into corresponding mechanical vibratory movements. Thus, the shutter movements under the influence of the speaker unit exactly correspond to the sound waves influencing the speaker unit. By this means, as the film 18 moves past the slot 16, an exposure band is formed on the film, when developed, shows an opaque band of the general type shown in Figure 3 at 24. Obviously when a positive print is made from this the band corresponding to 24 will be transparent and the remainder of the sound track will be opaque.

It will now be seen that with each increase of the initial sound the band 24 is widened and with each decrease it narrows. And when the positive print is run through an ordinary photo-electric cell reproducer, all essential features of the sound desired to be recorded will be faithfully reproduced.

There has thus been provided a simple and highly efficient method of the kind described and for the purpose specified, together with a simple and improved apparatus for carrying such method into effect.

It is obvious that changes may be made in the form, details and proportions of the apparatus here shown without departing from the material principles involved. It is not therefore desired to confine the invention to the use of the exact apparatus here illustrated but the scope of the invention is to be understood as fully commensurate with that of the appended claims.

I claim:—

1. In apparatus of the kind described, means for producing an actinic light ribbon including a lamp and a screen having a slot therein, said lamp and slot being arranged so that light from the lamp passing through the slot is directed toward a photo-sensitive film, a shutter working against the screen longitudinally of the slot and normally closing the same, and sound controlled electro-dynamic means to open said shutter in accordance with the volume, pitch and timbre of the sound.

2. In apparatus of the kind described, means for producing an actinic light ribbon including a lamp and a screen having a slot therein, said lamp and slot being arranged so that light from the lamp passing through the slot is directed toward a photo-sensitive film, a shutter working against the screen longitudinally of the slot and normally closing the same, and sound controlled means to open said shutter in accordance with the volume, pitch and timbre of the sound, said sound controlled means including an electro-dynamic speaker unit having a floating member directly and rigidly connected to the shutter to open the latter upon energization and permit it to close upon de-energization.

3. In apparatus of the kind described, means for producing an actinic light ribbon including a lamp and a screen having a slot therein and directing said ribbon to fall on a photo-sensitive surface, a shutter working longitudinally of the slot across said light ribbon from one edge towards the other and normally closed to cut off said ribbon, sound controlled electro-dynamic means to open said shutter in accordance with the volume, pitch and timbre of the sound, and spring means normally holding said shutter closed.

4. In apparatus of the kind described, means for producing an actinic light ribbon including a lamp and a screen having a slot therein and directing said ribbon to fall on a photo-sensitive surface, a shutter working longitudinally of the slot across said light ribbon from one edge towards the other and normally closed to cut off said ribbon, and sound controlled means to open said shutter in accordance with the volume, pitch and timbre of the sound, said sound controlled means including an electro-dynamic speaker unit having a floating member directly and rigidly connected to the shutter to open the latter upon energization and permit it to close upon de-energization, and spring means normally holding said shutter closed.

5. In apparatus of the kind described, means for producing an actinic light ribbon including a lamp and a screen having a slot therein, said lamp and slot being arranged so that light from the lamp passing through the slot is directed toward a photo-sensitive film, a shutter working against the screen longitudinally of the slot and normally closing the same, sound controlled electro-dynamic means to open said shutter in accordance with the volume, pitch and timbre of the sound, and spring means normally holding said shutter closed.

6. In apparatus of the kind described, means for producing an actinic light ribbon including a lamp and a screen having a slot therein, said lamp and slot being arranged so that light from the lamp passing through the slot is directed toward a photo-sensitive film, a shutter working against the screen longitudinally of the slot and normally closing the same, sound controlled means to open said shutter in accordance with the volume, pitch and timbre of the sound, said sound controlled means including an electro-dynamic speaker unit having a floating member directly and rigidly connected to the shutter to open the latter upon energization and permit it to close upon de-energization, and spring means normally holding said shutter closed.

STEWART DREW.